United States Patent
Schmucker et al.

(10) Patent No.: US 6,349,945 B1
(45) Date of Patent: Feb. 26, 2002

(54) CYLINDER HEAD GASKET

(75) Inventors: Frank Schmucker, Ehingen; Peter Schenk, Hohenstein, both of (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 09/594,855

(22) Filed: Jun. 15, 2000

Related U.S. Application Data

(63) Continuation of application No. PCT/EP99/04510, filed on Jun. 30, 1999.

(30) Foreign Application Priority Data

May 18, 1999 (DE) .......................... 199 22 634

(51) Int. Cl.[7] .............................. F02F 11/00; F16J 15/12
(52) U.S. Cl. ........................................ 277/592; 277/594
(58) Field of Search ................................ 277/592, 593, 277/594, 596

(56) References Cited

U.S. PATENT DOCUMENTS

| | | | |
|---|---|---|---|
| 4,103,913 A | * | 8/1978 | McDowell |
| 4,272,085 A | | 6/1981 | Fujikawa et al. |
| 4,535,999 A | * | 8/1985 | Locacius |
| 4,635,948 A | * | 1/1987 | Zerfass et al. |
| 4,743,421 A | | 5/1988 | McDowell et al. |
| 5,431,418 A | * | 7/1995 | Hagiwara et al. |
| 5,490,445 A | * | 2/1996 | Rao et al. |
| 5,564,714 A | * | 10/1996 | Katsuno et al. |
| 5,582,415 A | * | 12/1996 | Yoshida et al. |
| 5,634,646 A | * | 6/1997 | Miyaoh |
| 5,951,021 A | * | 9/1999 | Ueta |
| 6,093,467 A | * | 7/2000 | Forry |

FOREIGN PATENT DOCUMENTS

EP 468 526 A1 1/1992

\* cited by examiner

Primary Examiner—Anthony Knight
Assistant Examiner—John L. Beres

(57) ABSTRACT

Cylinder head gasket comprising a gasket plate which has at least one metal layer with elastic properties and in which a through opening is formed which is surrounded by a bead-like embossment formed in this metal layer, wherein the bead-like embossment forms an approximately linear, self-contained sealing zone with increased sealing surface pressure when the gasket is fitted and the metal layer is provided with a first coating consisting of a plastic material which has elastic properties on its side forming this sealing zone at least in the area of this sealing zone as well as to both sides of the latter; to improve the sealing capacity of the cylinder head gasket around the said through opening, the metal layer is coated on its side provided with the first coating with a sealing bead closed upon itself, likewise surrounding the through opening and consisting of a plastic material, this bead being arranged on the side of the sealing zone facing away from the through opening as well as at a radial distance from the sealing zone in relation to the through opening, wherein the ridge of the sealing bead is at a greater distance from the metal layer supporting it than the upper side of the first coating.

26 Claims, 3 Drawing Sheets

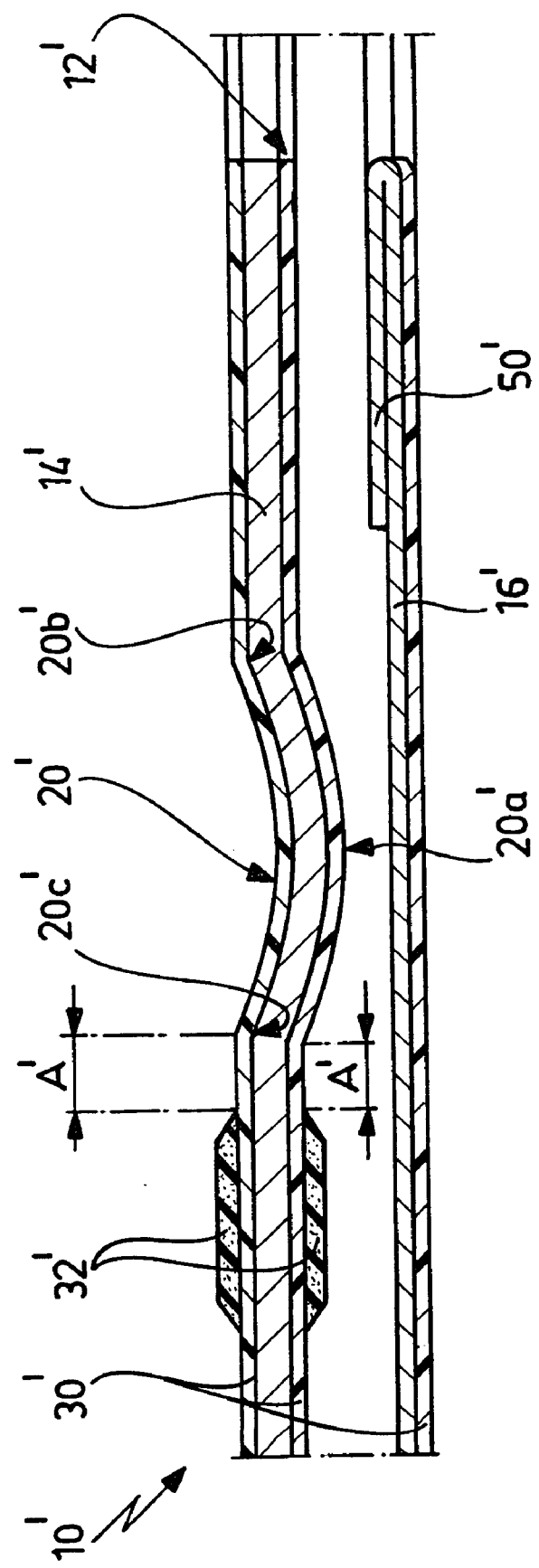

CYLINDER HEAD GASKET

This is a continuation of international PCT application No. PCT/EP99/04510 having international filing date of Jun. 30, 1999, which designates the United States.

BACKGROUND OF INVENTION

The invention relates to cylinder head gaskets, with which at least the one side of the gasket plate, i.e. at least its one main surface, is formed by a sheet-metal layer.

Cylinder head gaskets of this type mainly have a gasket plate which has several sheet steel layers placed one on top of the other, of which one or more consists or consist of spring steel sheet and is or are provided with embossments serving as sealing elements which surround through openings of the gasket plate. The embossments may be so-called full bead embossments which are approximately trough-shaped or U-shaped in cross section or so-called half bead embossments which are approximately step-like or Z-shaped in cross section. If such a bead-like embossment is located on the outer side of the cylinder head gasket, i.e. the bead-like embossment is formed in an outer layer of the gasket plate, in the case of a full bead embossment this abuts against the cylinder head or the engine block either with the convex embossment ridge or with its two so-called embossment feet when the cylinder head gasket is fitted; in the case of a half bead embossment, a, to a certain extent, linear abutment of the embossed metal layer on the cylinder head or engine block likewise results in one of the areas of the metal layer, in which this has been bent to form the half bead embossment.

In the case of cylinder head gaskets, with which the main surfaces of the gasket plate are formed by one or more metal layers, it is customary to coat the metallic main surfaces of the gasket plate partially or completely with a plastic material having elastic properties, in particular, in order to prevent leakages in the area of pores and/or cavities in the surfaces (sealing surfaces) of engine block and cylinder head to be sealed in relation to one another for the purpose of the so-called microsealing. These coatings normally have a layer thickness of 18 to 28 $\mu$m and consist of an elastomeric material, the degree of cross-linking of which is so great that the coating has sufficient elastic properties for the microsealing.

During operation of the engine, the sealing surfaces of cylinder head and engine block adjacent to the cylinder head gasket carry out movement in a direction at right angles to these surfaces, i.e. the width of the so-called sealing gap formed by the specified surfaces alters during operation of the engine not only with respect to time but also spatially (as a result of the component rigidities of cylinder head and engine block which are not the same all over). During these variations in the width of the sealing gap occurring during operation of the engine, the sealing surfaces of cylinder head and engine block may lift away from the cylinder head gasket in certain areas, despite the spring-back resilience properties of the cylinder head gasket, which can lead to leakages in the area of the bead-like embossments despite the coating described above:

Chippings or other machining residues but also dirt particles can be flushed out of an oil or a refrigerant channel of the engine block or cylinder head during operation of the engine and washed onto a surface area of the cylinder head gasket, from which the adjacent sealing surface of the engine block or cylinder head has just lifted away. Machining residues or dirt particles can, however, already reach the bead-like embossment during the fitting of the cylinder head gasket and, irrespective of how and when they reached the bead-like embossment, certainly have such dimensions that they cannot be pressed and embedded completely into the plastic coating of the cylinder head gasket by way of the sealing surface pressure between the cylinder head gasket, on the one hand, and engine block or cylinder head, on the other hand, and consequently leakages result. This applies, in particular, for the area of a bead-like embossment surrounding an oil or refrigerant through opening of the cylinder head gasket since the plastic coating will already be displaced partially or even entirely in the area of the approximately linear sealing zone, in which the coated bead-like embossment is pressed against the cylinder head or engine block, during the fitting of the cylinder head gasket, i.e. during tightening of the cylinder head screws. If, for example, a metal chip reaches this sealing zone between the bead-like embossment and the cylinder head or engine block, a passage results on both sides of the chip which results in leakage.

If the bead-like embossment is a half bead embossment, this projects outwards—proceeding from the through opening to be sealed—, i.e. in the direction towards the cylinder head or the engine block. In the case of a full bead embossment, this can either likewise project outwards or point away from the sealing surface of the cylinder head or engine block with its convex embossment ridge so that the two embossment feet facing this sealing surface each form, when the cylinder head gasket is fitted, an approximately linear, self-contained sealing zone with increased sealing surface pressure. In the last-mentioned case, as well, the problem explained above exists that chippings or other machining residues or dirt particles can reach the embossment feet and result in leakages.

The same problems may, however, also result in the interior of the gasket plate of a cylinder head gasket, the gasket plate of which has several—at least two—metal layers, of which at least one has elastic properties and is provided with a bead-like embossment surrounding the through opening to be sealed since, during operation of the engine, chippings or the like can pass between the metal layers and then onto such an "interior" bead-like embossment because, during operation of the engine, two metal layers of a gasket plate can also be lifted away from one another in certain areas, namely also in the area of an embossment ridge or an embossment foot. It should also be mentioned that such an "interior" bead-like embossment can also be a full bead embossment or a half bead embossment.

SUMMARY OF INVENTION

The object underlying the invention was to prevent the disadvantageous results of such a leakage in cylinder head gaskets of the types described, brought about at a bead-like embossment by a particle contamination.

On the one hand, the invention proceeds on the basis of a cylinder head gasket with a gasket plate which has at least one metal layer with elastic properties, one side of which forms an outer side of the gasket plate, wherein the gasket plate has a through opening as well as a bead-like embossment surrounding the latter and formed in the metal layer, this bead-like embossment forming an approximately linear, self-contained sealing zone with increased sealing surface pressure on the outer side of the gasket plate when the gasket is fitted, and wherein the metal layer has a first coating consisting of a plastic material with elastic properties on the outer side of the gasket plate at least in the area of the sealing zone as well as to both sides of the latter.

To accomplish the object as set, such a cylinder head gasket is designed in accordance with the invention such that the metal layer is coated on the outer side of the gasket plate with a sealing bead closed upon itself, surrounding the through opening and consisting of a plastic material, this sealing bead being arranged on the side of the sealing zone facing away from the through opening as well as at a slight distance from the sealing zone, wherein the ridge or apex of the sealing bead is at a greater distance from the metal layer than the upper side of the first coating of the metal layer.

On the other hand, the invention proceeds on the basis of a cylinder head gasket with a gasket plate which has at least two metal layers, of which at least a first one has elastic properties, wherein the gasket plate has a through opening as well as a bead-like embossment surrounding the latter and formed in the first metal layer, this bead-like embossment abutting against the other metal layer when the gasket is fitted and thus forming an approximately linear, self-contained sealing zone with increased sealing surface pressure, and wherein the first metal layer has a first coating consisting of a plastic material with elastic properties on its side facing the other metal layer at least in the area of the sealing zone as well as to both sides of the latter.

To accomplish the object as set, such a cylinder head gasket is designed in accordance with the invention such that the first metal layer is coated on its side facing the other metal layer with a sealing bead closed upon itself, surrounding the through opening and consisting of a plastic material, this bead being arranged on the side of the sealing zone facing away from the through opening as well as at a distance from the sealing zone, wherein the ridge of the sealing bead is at a greater distance from the first metal layer than the upper side of the first coating.

If the bead-like embossment is a full bead embossment, it will generally be preferred for the sealing bead provided in accordance with the invention to be arranged outside the bead-like embossment when the sealing bead is located on that side of the metal layer supporting it, on which the convex side of the bead-like embossment is also located. In this case, the sealing bead is not only arranged at a distance from the ridge of the bead-like embossment and thus from the sealing zone formed by it but the sealing bead is also advantageously mounted at a distance from the embossment foot facing it (in the plan view of the embossed metal layer), namely such that this distance from this embossment foot is dimensioned to be of such a size as if the sealing bead were mounted on the other side of the metal layer—adjacent to this embossment foot.

In each of the two cases, the object as set may be accomplished in two different ways with the aid of the sealing bead provided in accordance with the invention: On the one hand, the sealing bead—when seen from the through opening—forms a second sealing zone behind the bead-like embossment, and when the sealing bead has been produced from a plastic material having adequate plastic properties and extends at an adequately small distance from the bead-like embossment, the plastic material of the sealing bead, which is subject to pressure when the gasket is fitted, flows in the direction towards the bead-like embossment and closes the leakage passages formed on both sides of the bead-like embossment by impurities located on it.

In principle, the sealing bead could also be provided on the side of the bead-like embossment or sealing zone facing the through opening, wherein the roles of the two sealing elements bead-like embossment and sealing bead would then be exchanged; however, embodiments are preferred with a sealing bead located on the side of the bead-like embossment facing away from the through opening because the bead-like embossment then, in normal circumstances, takes over the function of a first and main sealing element in accordance with its original task.

The plastic material used for the production of the sealing bead may be selected such that in the cold state it already has sufficient plastic properties and thus adequate flow characteristics on account of a relatively low degree of cross-linking in order to take into consideration the fact that impurities leading to a leakage can already come to rest on the bead-like embossment during the assembly of the engine; the plastic material used to form the sealing bead can, however, also be of such a nature that flow characteristics sufficient for accomplishing the object as set are only reached at the relatively high temperatures occurring during operation of the engine.

In preferred embodiments of the inventive cylinder head gasket the sealing bead is a sealing element preferably applied with the screen printing process, namely, in particular, a sealing bead with a cross-sectional shape approximating a flat rectangle since the screen printing process enables width and height of the sealing bead to be produced to be determined rather exactly.

It would be possible to have the first coating end immediately behind the sealing zone formed by the bead-like embossment and to apply the sealing bead to the metal layer, namely still at a relatively small distance from the sealing zone formed by the bead-like embossment. However, embodiments are preferred, with which the sealing bead has been generated on the first coating, namely, in particular, with the screen printing process.

It already follows from the preceding comments that it is advantageous when the plastic material forming the sealing bead has a greater plasticity than the plastic material used for the first coating. In the case of preferred materials for the two plastic materials, these are fluorocarbon polymers, wherein the first coating is intended to be formed from a fluorocarbon polymer, the degree of cross-linking of which is greater than that of the fluorocarbon polymer forming the sealing bead—in other words, the fluorocarbon polymer forming the sealing bead is intended to have a greater plasticity adequate for sealing off the leakages described.

For a good efficacy of the sealing bead to be provided in accordance with the invention, the sealing bead (in the non-pressed state) should have such a height that the distance of the ridge of the sealing bead from the metal layer supporting it is 5 to 210 $\mu$m greater than the distance of the upper side of the first coating from this metal layer. If the bead-like embossment is a full bead embossment, the sealing bead should be higher than in the case of a half bead embossment, wherein it has proven to be particularly advantageous when, with the bead-like embossment designed as a half bead embossment, the difference in distance mentioned is 5 to 80 $\mu$m, in particular, 20 to 30 $\mu$m and when, with the bead-like embossment designed as a full bead embossment, the difference in distance mentioned is 5 to 150 $\mu$m, in particular, 50 to 100 $\mu$m.

As shown by the preceding comments, the size of the distance of the sealing bead from the sealing zone formed by the bead-like embossment is considerable when the solution of the object as set is based wholly or partially on an adequate flow of the sealing bead material. On the other hand, the distance between sealing zone and sealing bead may also not be too small in order to preclude the impurities causing a leakage from reaching as far as the area of the sealing bead. For this reason, it is recommended that the distance of the sealing bead from the sealing zone be dimensioned such that it is at least 0.5 mm but preferably no greater than 3 mm.

The metal layer areas to be provided later with the first coating are advantageously covered with a conventional coupling agent before the coating is applied, and the surface areas to be provided with the sealing bead can also be covered beforehand with a coupling agent.

In addition, it is recommended that the first coating and the sealing bead be covered with a nonstick coating in order to prevent any adhesion of the sealing materials to the cylinder head or engine block.

In principle, the inventive solution is recommended for a reliable sealing of fluid through openings of the gasket plate; above all when a full bead embossment is used as bead-like embossment, the inventive solution can, however, also be considered for combustion chamber through openings of cylinder head gaskets, in particular, when the plastic materials used are sufficiently temperature-resistant and arranged at such a distance from the adjacent combustion chamber through opening that they can withstand the temperatures occurring at their locations during operation of the engine.

Additional advantages, features and details of the invention result from the attached claims and/or from the following description as well as the attached drawings illustrating two particularly advantageous embodiments of the inventive cylinder head gasket; in the drawings:

DESCRIPTION OF THE DRAWING

FIG. 3 shows a section corresponding to FIG. 2 through the second embodiment.

DESCRIPTION OF THE INVENTION

Figure 1:
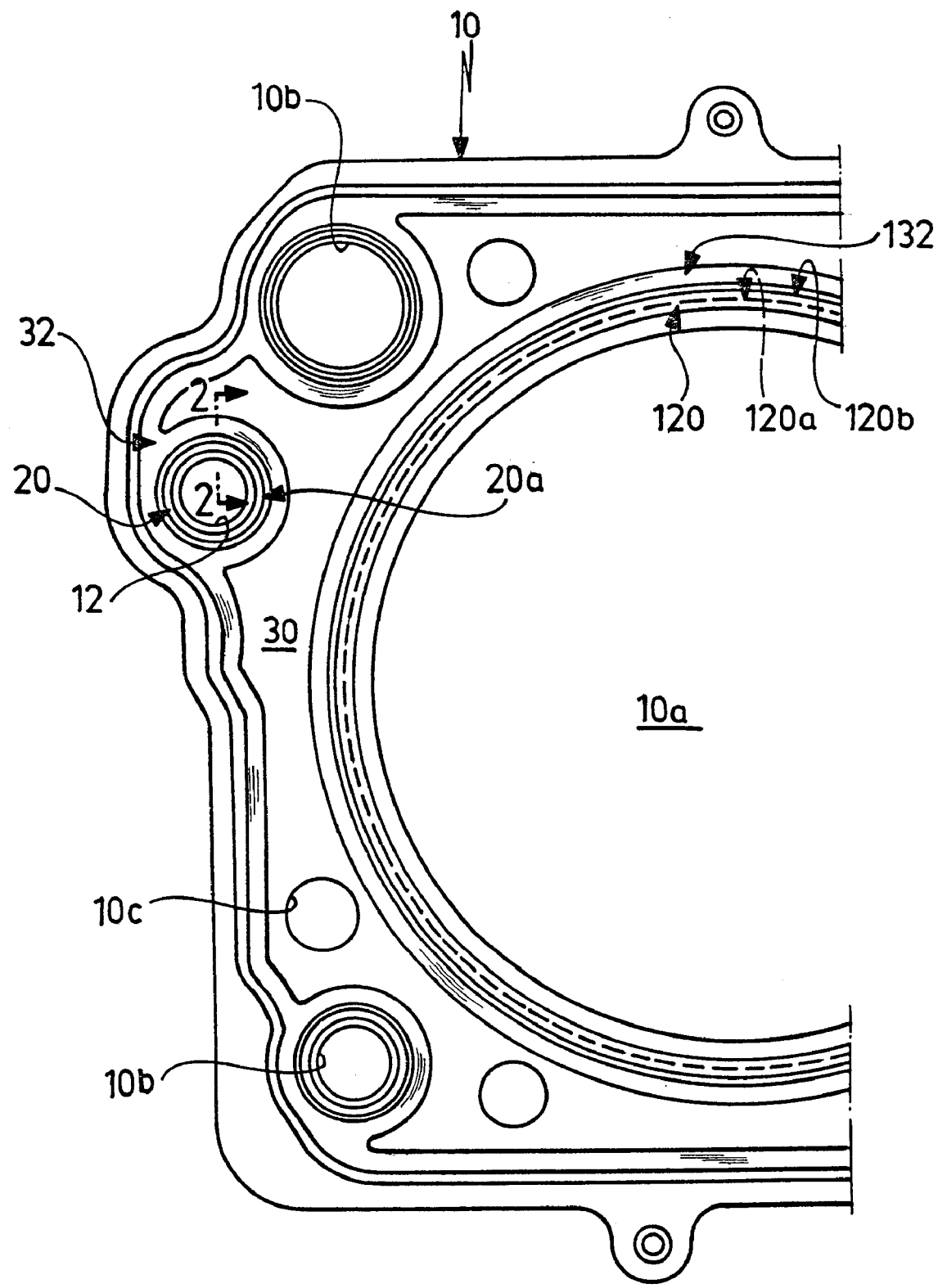
FIG. 1 shows a plan view of part of the first embodiment of the inventive cylinder head gasket.
Figure 2:
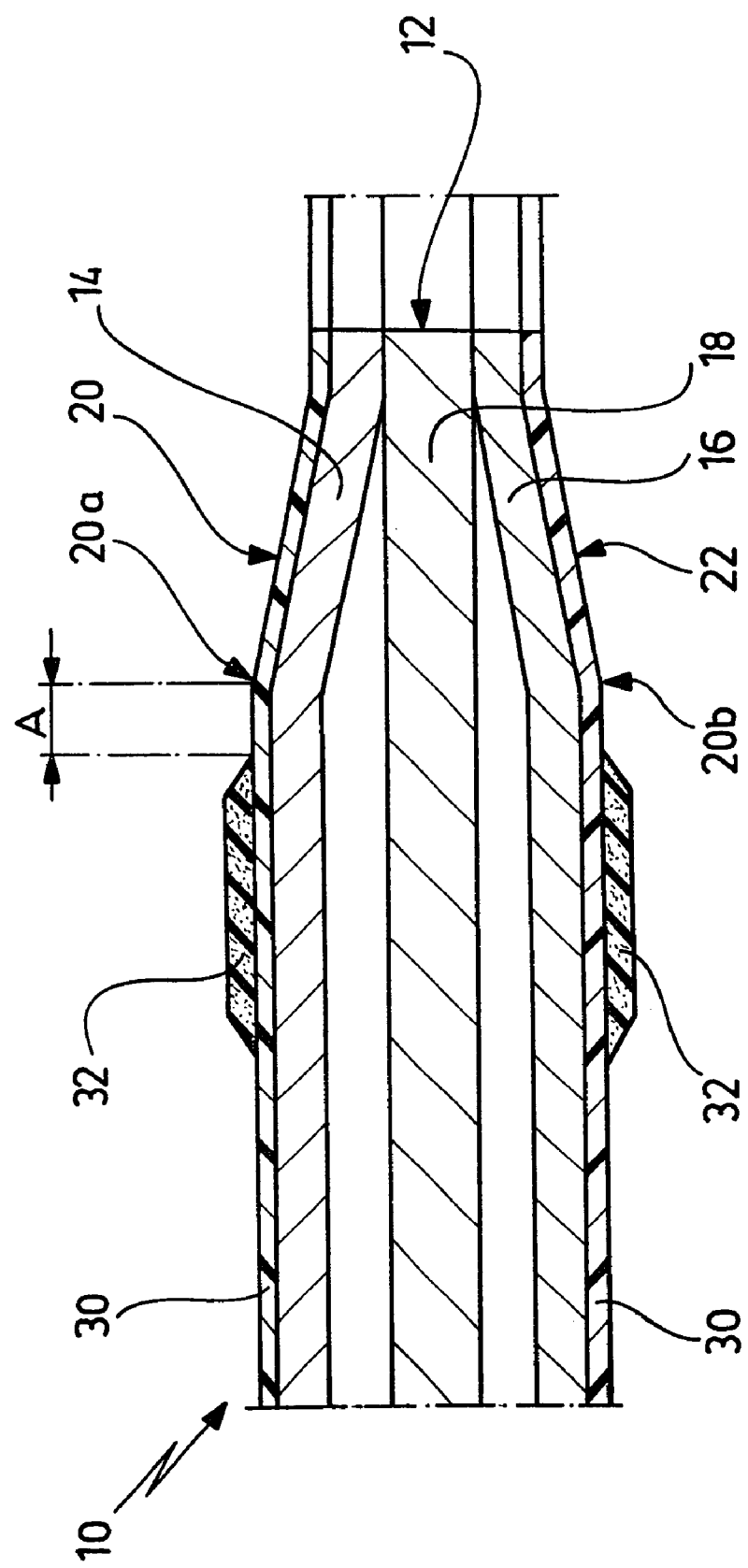
FIG. 2 shows a section through this gasket part in accordance with line 2—2 in FIG. 1.

The cylinder head gasket shown in FIG. 1 has a gasket plate 10, in which inter alia several combustion chamber through openings 10a, of which only part of a single opening is illustrated, through openings 10b for cylinder head screws and fitting sleeves as well as fluid through openings 10c and 12 for engine oil and refrigerant are provided; in the case of the through opening 12 shown in FIGS. 1 and 2, this is intended to be a through opening for pressure oil.

As is apparent from FIG. 2, the gasket plate 10 consists essentially of three sheet steel layers one on top of the other, namely two outer metal layers 14 and 16 consisting of spring steel sheet as well as a central metal layer 18 which need not have any elastic properties. Each of the outer metal layers 14 and 16 has around the through opening 12 a half bead embossment 20 and 22, respectively, which surrounds the through opening 12 annularly, i.e. is closed upon itself. The ridge of each of these half bead embossments has been designated as 20a and 20b, respectively.

The outer sides of the outer metal layers 14 and 16 forming the two main surfaces of the gasket plate 10 are provided with a first coating 30 consisting of a first plastic material with elastic properties, wherein this first coating extends beyond the embossment ridge 20a and 20b, respectively; the outer metal layers 14 and 16 are preferably coated over their entire surface.

In accordance with the invention, the through opening 12 is, however, also enclosed annularly by two additional sealing elements, namely by a respective sealing bead 32 on each of the two main surfaces of the gasket plate 10. Each sealing bead 32 extends at a relatively small distance "A" from the adjacent embossment ridge 20a and 20b, respectively, of the side of the half bead embossment 20 and 22, respectively, facing away from the through opening 12 and has a cross-sectional shape which corresponds to that of a flat trapezoid. Each sealing bead 32 consists of a second plastic material, the plasticity of which is greater than that of the first plastic material used for the coatings 30, and the layer thickness of each sealing bead 32 is preferably greater than the layer thickness of the coating 30, onto which the sealing bead has been applied with the screen printing process. As is apparent from FIG. 2, the width of the sealing bead 32 or rather the length of its cross section is a multiple of the distance "A" of the sealing bead from the embossment ridge 20a and 20b, respectively, which, when the cylinder head gasket is fitted, defines an approximately linear sealing zone, in which the cylinder head gasket is pressed against the cylinder head or engine block with the relevant, coated half bead embossment.

It is apparent from FIG. 1 how the invention can be realized around a combustion chamber through opening 10a. FIG. 1 shows a full bead embossment 120 which surrounds the combustion chamber through opening 10a concentrically and the embossment ridge of which has been designated as 120a as well as an inventive sealing bead 132 which is concentric to the combustion chamber through opening and the full bead embossment and which is at a slight distance from the radially outer boundary 120b (the outer, so-called embossment foot of the full bead embossment 120).

In FIG. 3 which illustrates the second embodiment in a section corresponding to FIG. 2, the same reference numerals as in FIGS. 1 and 2 have been used, as far as possible, but with the addition of a prime.

The gasket plate 10' illustrated in FIG. 3 has two metal layers, namely a first metal layer 14' with elastic properties and a second metal layer 16', wherein in the area of the gasket plate 10' illustrated in FIG. 3 this has a through opening 12' which can, for example, be a through opening for oil. The first metal layer 14' is provided with a full bead embossment 20' which is closed upon itself, surrounds the through opening 12' and projects in the direction towards the second metal layer 16'; an area of the second metal layer 16' comprising the through opening 12' is folded back onto this layer and thus forms in a known manner a so-called stopper 50' for the bead-like embossment 20', as a result of which the bead-like embossment can be prevented from being pressed completely flat during the fitting of the cylinder head gasket, i.e. during tightening of the cylinder head screws.

For the purpose of microsealing in relation to the sealing surfaces of cylinder head and engine block, the two metal layers 14' and 16' are coated on the two outer sides of the gasket plate 10' with a first coating 30' consisting of a plastic material with elastic properties; in order to improve the sealing capability of the bead-like embossment 20' on the metal layer 16', the second side of the metal layer 14' located in the interior of the gasket plate is, however, also provided with such a coating 30'.

In accordance with the invention, sealing beads 32' have now been applied to both sides of the metal layer 14', namely on its first coatings 30', these beads surrounding the bead-like embossment 20' and forming sealing bead rings closed upon themselves.

With the cylinder head gasket fitted, the full bead embossment 20' is pressed with its coated embossment ridge 20a' against the metal layer 16' and with its two, likewise coated embossment feet 20b' and 20c' against the sealing surface of the cylinder head or engine block. The sealing bead 32' located on the one outer side of the gasket plate 10' is again at a radial distance A' from the sealing zone in relation to the through opening 12', the sealing zone being formed by the embossment foot 20c' when the cylinder head gasket is fitted.

On the basis of the sealing bead 32' located in the interior of the gasket plate 10' it is, however, apparent that in the case of a full bead embossment the distance ratios are somewhat different to those with a half bead embossment, as shown in FIGS. 1 and 2: Since, in the fitted state of the cylinder head gasket partially illustrated in FIG. 3 (and during operation of the engine) the bead-like embossment 20' is flattened in comparison with its shape illustrated in FIG. 3, the resulting sealing zone between the coated bead-like embossment 20' and the metal layer 16' is not strictly linear but rather somewhat strip-like and this sealing zone can extend, in certain circumstances, as far as the vicinity of the embossment feet 20b' and 20c'. For this reason, as well, the sealing bead 32' located in the interior of the gasket plate 10' is likewise at a distance A' from the embossment foot 20c'.

In the following, formulas for the plastic materials, from which the first coating and the sealing bead can be produced, as well as materials which are suitable as coupling agents and for the nonstick coating are specified, namely including the source of supply, wherein all the place names with the exception of Bollate designate places located in Germany. The abbreviation "phr" used in the formulas for the amount specified means, as generally customary in polymer chemistry, parts by weight per 100 parts by weight of rubber or polymer.

| Name of Material | Amount | Supply Company | Company Location |
|---|---|---|---|
| First Coating | | | |
| Tecnoflon P710 | 100 phr | Ausimont S.p.A. | Bollate, 20021 Italy |
| Luperco 101 XL | 3 phr | Elf-Atochem Deutschland GmbH | Guenzburg |
| TIAC (triallyl-sym-triazine-2,4,6-1H,3H,5H-trione) | 4 phr | Akzo GmbH | Dueren |
| Zinc oxide | 5 phr | Brüggemann Sprit + Chemiefabrik | Heilbronn |
| MT black Thermax N 990 | 30 phr | Lehmann und Voss & Co | Hamburg |
| Sealing Bead | | | |
| Tecnoflon N 215 | 100 phr | Ausimont S.p.A. | Bollate 20021 Italy |
| Magnesium oxide | 4 phr | Nordmann Rassmann GmbH & Co | Hamburg |
| Calcium oxide | 2 phr | Rhein Chemie | Mannheim |
| MT black Thermax N 990 | 30 phr | Lehmann und Voss & Co | Hamburg |
| Diak No. 3 (diamine) | 2 phr | DuPont Dow Elastomers GmbH | Bad Homburg |
| Coupling Agent | | | |
| Chemosil 512 | | Henkel KgaA | Duesseldorf |
| Nonstick Coating | | | |
| Lubaprint wax dispersion 942 (PE wax coating) | | L.P. Bader & Co GmbH | Rottweil |

We claim:

1. Cylinder head gasket comprising a gasket plate having at least one metal layer with elastic properties, one side of said layer forming an outer side of the gasket plate, said gasket plate having a through opening as well as a bead-like embossment surrounding said opening and formed in the metal layer, said embossment forming an annular sealing zone with increased sealing surface pressure on the outer side of the gasket plate when the gasket is fitted, said metal layer having a first plastic material coating with elastic properties on the outer side of the gasket plate at least in the area of the sealing zone as well as to both sides of said zone, said metal layer being coated on the outer side of the gasket plate with a plastic material sealing bead having a bead body and a ridge and forming a ring that surrounds the through opening, said bead being arranged on the side of the sealing zone facing away from the through opening as well as at a radial distance from said sealing zone in relation to the through opening, and, in an area of the metal layer supporting said sealing bead, said ridge being at a greater distance from the metal layer than an outer side of the first coating, wherein said bead body is spaced sufficiently radially close to said sealing zone and the plastic material thereof has a plasticity sufficiently greater than the plasticity of the plastic material of said first coating that the plastic material of said bead body flows in a direction towards said sealing zone to provide a seal there when the gasket is fitted.

2. Cylinder head gasket as defined in claim 1, characterized in that the sealing bead (32; 32') is arranged on the first coating (30; 30').

3. Cylinder head gasket as defined in claim 1, characterized in that the plastic material forming said first coating and the plastic material forming said sealing bead are fluorocarbon polymers, wherein the first coating (30; 30') is formed from a fluorocarbon polymer having a degree of cross-linking greater than that of the fluorocarbon polymer forming the sealing bead (32; 32').

4. Cylinder head gasket as defined in claim 1, characterized in that the distance of the ridge of the sealing bead (32; 32') from the metal layer (14, 16; 14') supporting it is 5 to 210 μm greater than the distance of the upper side of the first coating (30; 30') from this metal layer.

5. Cylinder head gasket as defined in claim 4, characterized in that when the bead-like embossment is designed as a half bead embossment (20, 22), said difference in distance is 5 to 80 μm.

6. Cylinder head gasket as defined in claim 5, characterized in that said difference in distance is 20 to 30 μm.

7. Cylinder head gasket as defined in claim 4, characterized in that when the bead-like embossment is designed as a full bead embossment (20'), said difference in distance is 5 to 150 μm.

8. Cylinder head gasket as defined in claim 7, characterized in that said difference in distance is 50 to 100 μm.

9. Cylinder head gasket as defined in claim 1, characterized in that the distance (A, A') of the sealing bead (32; 32') from the sealing zone is at least 0.5 mm.

10. Cylinder head gasket as defined in claim 1, characterized in that the distance (A, A') of the sealing bead (32; 32') from the sealing zone is at the most 3 mm.

11. Cylinder head gasket as defined in claim 1, characterized in that the cross section of the sealing bead (32; 32') has approximately the shape of a flat rectangle or trapezoid.

12. Cylinder head gasket as defined in claim 1, characterized in that the length of the cross section of the sealing bead (32; 32') is a multiple of the distance (A; A') of the sealing bead from the sealing zone.

13. Cylinder head gasket as defined in claim 1, characterized in that the first coating (30; 30') and the sealing bead (32; 32') are covered with a nonstick coating.

14. Cylinder head gasket comprising a gasket plate having at least two metal layers, at least a first one of said layers having elastic properties, said gasket plate having a through opening as well as a bead-like embossment surrounding said opening and formed in the first metal layer, said embossment abutting against a second one of said metal layers when the gasket is fitted and thus forming an annular sealing zone with increased sealing surface pressure, said first metal layer having a first plastic material coating with elastic properties on a side of said first metal layer facing the second metal layer at least in the area of the sealing zone as well as both sides of said zone, said first metal layer being coated on its side facing the second metal layer with a plastic material sealing bead having a bead body and a ridge and forming a ring that surrounds the through opening, said bead being arranged on the side of the sealing zone facing away from the through opening as well as at a radial distance from said sealing zone in relation to the through opening and, in an area of the first metal layer supporting said sealing bead, said ridge being at a greater distance from the first metal layer than the side of the first coating facing said second metal layer, wherein said bead body is spaced sufficiently radially close to said sealing zone and the plastic material thereof has a plasticity sufficiently greater than the plasticity of the plastic material of said first coating that the plastic material of said bead body flows in a direction towards said sealing zone to provide a seal there when the gasket is fitted.

15. Cylinder head gasket as defined in claim 14, characterized in that the sealing bead (32; 32') is arranged on the first coating (30; 30').

16. Cylinder head gasket as defined in claim 14, characterized in that the plastic material forming said first coating and the plastic material forming said sealing bead are fluorocarbon polymers, wherein the first coating (30; 30') is formed from a fluorocarbon polymer having a degree of cross-linking greater than that of the fluorocarbon polymer forming the sealing bead (32; 32').

17. Cylinder head gasket as defined in claim 14, characterized in that the distance of the ridge of the sealing bead (32; 32') from the metal layer (14, 16; 14') supporting it is 5 to 210 μm greater than the distance of the upper side of the first coating (30; 30') from this metal layer.

18. Cylinder head gasket as defined in claim 17, characterized in that when the bead-like embossment is designed as a half bead embossment (20, 22), said difference in distance is 5 to 80 μm.

19. Cylinder head gasket as defined in claim 18, characterized in that said difference in distance is 20 to 30 μm.

20. Cylinder head gasket as defined in claim 17, characterized in that when the bead-like embossment is designed as a full bead embossment (20'), said difference in distance is 5 to 150 μm.

21. Cylinder head gasket as defined in claim 20, characterized in that said difference in distance is 50 to 100 μm.

22. Cylinder head gasket as defined in claim 14, characterized in that the distance (A, A') of the sealing bead (32; 32') from the sealing zone is at least 0.5 mm.

23. Cylinder head gasket as defined in claim 14, characterized in that the distance (A, A') of the sealing bead (32; 32') from the sealing zone is at the most 3 mm.

24. Cylinder head gasket as defined in claim 14, characterized in that the cross section of the sealing bead (32; 32') has approximately the shape of a flat rectangle or trapezoid.

25. Cylinder head gasket as defined in claim 14, characterized in that the length of the cross section of the sealing bead (32; 32') is a multiple of the distance (A; A') of the sealing bead from the sealing zone.

26. Cylinder head gasket as defined in claim 14, characterized in that the first coating (30; 30') and the sealing bead (32; 32') are covered with a nonstick coating.

* * * * *